United States Patent
Curotto

(10) Patent No.: US 9,611,685 B2
(45) Date of Patent: Apr. 4, 2017

(54) AUTOMATED COVER

(71) Applicant: THE CUROTTO-CAN, LLC, Chattanooga, TN (US)

(72) Inventor: John Domenic Curotto, Sonoma, CA (US)

(73) Assignee: The Curotto-Can, LLC, Chattanooga, TN (US)

( * ) Notice: Subject to any disclaimer, the term of this patent is extended or adjusted under 35 U.S.C. 154(b) by 0 days.

(21) Appl. No.: 15/000,218

(22) Filed: Jan. 19, 2016

(65) Prior Publication Data

US 2016/0130856 A1    May 12, 2016

Related U.S. Application Data

(62) Division of application No. 14/023,628, filed on Sep. 11, 2013, now Pat. No. 9,278,805, which is a division of application No. 13/098,190, filed on Apr. 29, 2011, now Pat. No. 8,556,117.

(60) Provisional application No. 61/329,616, filed on Apr. 30, 2010.

(51) Int. Cl.
*B65F 3/12* (2006.01)
*E05F 15/73* (2015.01)
*B65F 1/16* (2006.01)
*B65G 65/23* (2006.01)

(52) U.S. Cl.
CPC ............ *E05F 15/73* (2015.01); *B65F 1/1623* (2013.01); *B65F 1/1638* (2013.01); *B65F 3/12* (2013.01); *B65G 65/23* (2013.01); *B65F 2210/184* (2013.01)

(58) Field of Classification Search
None
See application file for complete search history.

(56) References Cited

U.S. PATENT DOCUMENTS

| 123,267 | A | | 1/1872 | Large |
| 254,237 | A | | 2/1882 | Pickering |
| 1,470,630 | A | | 10/1923 | Mahr |
| 2,069,499 | A | | 2/1937 | Marin et al. |
| 2,913,029 | A | | 11/1959 | Paton |
| 3,112,834 | A | | 12/1963 | Dempster et al. |
| 3,215,182 | A | | 11/1965 | Silverman |
| 3,321,036 | A | | 5/1967 | Keenan et al. |
| 3,597,786 | A | | 8/1971 | Ruhl |
| 3,687,317 | A | * | 8/1972 | Gagel .................. B65F 1/1615 414/411 |
| 3,828,899 | A | | 8/1974 | Scott |

(Continued)

FOREIGN PATENT DOCUMENTS

EP    0860380    2/2001
GB    2082142    3/1982

OTHER PUBLICATIONS

Curotto, John Michael, "Curotto Scale System Project", Dec. 1, 2008, 12 pgs.

*Primary Examiner* — Jonathan M Dager

(57) ABSTRACT

A novel method for preventing material contained inside a collection bin from being blown out of the collection bin is provided. The collection bin includes an automated cover system. The automated cover system comprises an actuator system that is actuated in response to movement of a specific item, such as the fork assembly and/or the collection bin. Upon actuation, the actuator system of the automated cover system automatically moves a cover.

13 Claims, 12 Drawing Sheets

(56) References Cited

U.S. PATENT DOCUMENTS

| | | | |
|---|---|---|---|
| 4,042,137 A | 8/1977 | Hughes et al. | |
| 4,143,451 A * | 3/1979 | Craig | F16C 11/12 29/434 |
| 4,152,979 A * | 5/1979 | Schmidt | B30B 9/3046 100/100 |
| 4,155,584 A | 5/1979 | Pracchia | |
| 4,175,903 A | 11/1979 | Carson | |
| 4,186,844 A * | 2/1980 | Swanson | B65F 1/16 220/817 |
| 4,363,588 A * | 12/1982 | Stickney | B65F 1/122 414/408 |
| 4,575,300 A | 3/1986 | George | |
| 4,580,940 A | 4/1986 | Sheaves | |
| 4,631,777 A | 12/1986 | Takimoto | |
| 4,687,405 A | 8/1987 | Olney | |
| 4,722,270 A * | 2/1988 | Wall | B30B 9/3042 100/233 |
| 4,726,726 A | 2/1988 | Dossena et al. | |
| 4,889,462 A | 12/1989 | Naab et al. | |
| 4,892,218 A * | 1/1990 | Reiling | B65F 1/163 220/263 |
| 5,002,450 A | 3/1991 | Naab | |
| 5,007,786 A | 4/1991 | Bingman | |
| 5,070,687 A | 12/1991 | Schweigert | |
| 5,094,487 A | 3/1992 | Drewry | |
| 5,105,967 A * | 4/1992 | Horpestad | B65F 1/1615 220/817 |
| 5,119,894 A | 6/1992 | Crawford et al. | |
| 5,135,129 A | 8/1992 | Joly | |
| 5,149,153 A | 9/1992 | Drewry et al. | |
| 5,209,312 A | 5/1993 | Jensen | |
| 5,218,781 A | 6/1993 | Miller | |
| 5,224,744 A | 7/1993 | Michelutti | |
| 5,230,393 A | 7/1993 | Mezey | |
| 5,244,109 A | 9/1993 | Mullett et al. | |
| 5,265,311 A | 11/1993 | Gard | |
| 5,266,000 A | 11/1993 | LeBlanc, Jr. | |
| 5,331,763 A | 7/1994 | Miller | |
| 5,415,314 A | 5/1995 | McCollum | |
| 5,447,405 A | 9/1995 | Bayne et al. | |
| 5,490,606 A * | 2/1996 | Lombardo | B65F 1/004 220/324 |
| 5,565,846 A | 10/1996 | Geiszler et al. | |
| 5,622,277 A | 4/1997 | Van Giezen et al. | |
| 5,641,947 A | 6/1997 | Riddle, Jr. | |
| 5,738,395 A | 4/1998 | Probst | |
| 5,784,947 A | 7/1998 | Bayne et al. | |
| 5,807,056 A | 9/1998 | Osborn et al. | |
| 5,826,485 A | 10/1998 | Bayne et al. | |
| 5,837,945 A * | 11/1998 | Cornwell | B65F 3/04 177/136 |
| 5,941,405 A | 8/1999 | Scales et al. | |
| 6,027,299 A | 2/2000 | Williams | |
| 6,139,244 A * | 10/2000 | VanRaden | B65F 3/041 414/408 |
| 6,167,795 B1 | 1/2001 | Bayne et al. | |
| 6,191,691 B1 | 2/2001 | Serrault | |
| 6,220,647 B1 | 4/2001 | Winkler | |
| 6,224,317 B1 | 5/2001 | Kann et al. | |
| 6,253,376 B1 | 7/2001 | Ritter | |
| 6,422,800 B1 * | 7/2002 | Reichow | G01G 19/083 177/136 |
| 6,666,485 B1 | 12/2003 | Moret | |
| 6,687,656 B2 | 2/2004 | Durbin et al. | |
| 6,749,076 B2 | 6/2004 | Fingerhut et al. | |
| 6,761,414 B1 | 7/2004 | Broberg | |
| 6,773,054 B2 | 8/2004 | Martini | |
| 6,821,074 B2 | 11/2004 | Schreiber et al. | |
| 6,863,249 B1 | 3/2005 | Alvord | |
| 7,000,289 B2 * | 2/2006 | Cedrone | E05F 1/063 16/273 |
| 7,146,294 B1 | 12/2006 | Waitkus, Jr. | |
| 7,151,231 B2 | 12/2006 | Kamakau | |
| 7,198,166 B2 * | 4/2007 | Sholinder | B65F 1/02 220/4.28 |
| 7,210,890 B2 | 5/2007 | Curotto et al. | |
| 7,296,704 B2 | 11/2007 | Ferrini | |
| 7,313,887 B2 | 1/2008 | Hibbs et al. | |
| 7,347,657 B2 | 3/2008 | Brunn | |
| 7,390,159 B2 | 6/2008 | Rimsa et al. | |
| 7,396,996 B1 | 7/2008 | Shotey et al. | |
| 7,607,628 B2 | 10/2009 | Elder et al. | |
| 7,633,020 B2 | 12/2009 | Santi et al. | |
| 7,737,372 B2 | 6/2010 | Dougherty et al. | |
| 7,897,884 B2 | 3/2011 | Harish | |
| 8,146,767 B1 * | 4/2012 | Grant | B65F 1/163 220/262 |
| 8,226,146 B2 | 7/2012 | Duffy et al. | |
| 8,330,059 B2 | 12/2012 | Curotto | |
| 8,550,764 B2 | 10/2013 | Rowland et al. | |
| 9,028,193 B2 * | 5/2015 | Goedken | B65F 9/00 414/408 |
| 9,114,931 B2 * | 8/2015 | Spahmann | B65F 1/02 |
| 9,728,805 | 3/2016 | Curotto | |
| 2001/0000464 A1 | 4/2001 | Beale | |
| 2005/0095096 A1 * | 5/2005 | Curotto | B65F 1/122 414/406 |
| 2006/0127202 A1 * | 6/2006 | Tryggvason | B65F 1/1484 414/21 |
| 2006/0144844 A1 | 7/2006 | Kita | |
| 2007/0278019 A1 | 12/2007 | Santi et al. | |
| 2008/0140253 A1 * | 6/2008 | Brown | B65F 1/1473 700/245 |
| 2010/0089916 A1 | 4/2010 | Fielden | |
| 2010/0179912 A1 * | 7/2010 | Curotto | G06Q 10/30 705/308 |
| 2010/0183410 A1 | 7/2010 | Curotto | |
| 2010/0206642 A1 | 8/2010 | Curotto | |
| 2010/0281654 A1 | 11/2010 | Curotto | |
| 2011/0038696 A1 | 2/2011 | Ummel, Jr. | |
| 2011/0188976 A1 * | 8/2011 | Rowland | B65F 3/041 414/408 |
| 2011/0266296 A1 * | 11/2011 | Curotto | B65F 1/1638 220/810 |
| 2012/0273498 A1 * | 11/2012 | Curotto | B65F 1/06 220/495.06 |
| 2013/0195590 A1 | 8/2013 | Goedken | |
| 2014/0182951 A1 | 7/2014 | Curotto | |

* cited by examiner

AUTOMATED COVER

CROSS-REFERENCE TO RELATED APPLICATIONS

This application is a divisional of U.S. patent application No. 14/023,628, filed Sep. 11, 2013, entitled "Automated Cover," now issued U.S. Pat. No. 9,278,805, which is a divisional of U.S. patent application Ser. No. 13/098,190, filed Apr. 29, 2011, entitled "Automated Cover" now issued U.S. Pat. No. 8,556,117, which claims the benefit of U.S. Provisional Application No. 61/329,616, filed Apr. 30, 2010, entitled "Automated Cover," all of which are hereby incorporated hereby reference.

BACKGROUND OF THE INVENTION

Several types of waste collection vehicles exist. Waste collection vehicles can be front loaders, rear loaders, automated side loaders, and grapple trucks. Waste collection vehicles are typically utilized to pick up quantities of waste for hauling to a determined area, such as a landfill, transfer station, or material recovery facility. Waste collection vehicles can be further utilized or modified to collect recyclables for transport to a recycling facility.

The allocation of waste removal equipment has been improved by the use of large trucks having compaction capabilities extending their effective range and capacity between unloadings. Further, the vehicles have been improved by the addition of specialized hoists to lift trash containers into the truck. These collection vehicles have also been improved by the utilization of collection/intermediate bins. The collection bin allows a front and/or side loading waste collection vehicle designed for the collection of large waste containers, such as dumpsters, to collect smaller, non-commercial waste containers.

As the routes of these trucks are extended, the trucks with collection bins spend more and more time on the roads driving between customers. During transport, if the collection bin contains any waste materials, the wind can blow a portion of this waste out of the bin. Littering from the collection bin is undesirable to customers and/or operators.

SUMMARY OF THE INVENTION

The disclosure describes a novel collection bin for a waste collection vehicle. The collection bin includes an automated cover system.

In part, this disclosure describes a collection bin with an automated cover system. The collection bin with an automated cover system includes the following:
a) a vessel attached to a frame;
b) at least one pocket attached to the frame for receiving at least one fork prong of a fork assembly of a waste collection vehicle;
c) a cover;
d) a flap, the flap attached to the cover;
e) a pivot system, the pivot system comprising:
   a rotatable bar,
   an anchor portion attached to the rotatable bar and at least one of the vessel and the frame, and
   a moveable portion attached to the rotatable bar; and
f) an actuator system mounted to at least one of the vessel and the frame, the actuator system is moveably coupled to the rotatable bar.
The moveable portion attaches to at least one of the cover and the flap.

Another aspect of this disclosure describes an automated cover system that includes: a cover; a flap, the flap attached to the cover; a pivot system, the pivot system attaches the cover and the flap to a rotatable bar and provides an anchor portion for attaching the rotatable bar to a collection bin; and an actuator system, the actuator system is moveably coupled to the rotatable bar and the actuator system provides a mounting system for attaching the actuator to the collection bin.

In part, this disclosure describes a method for preventing material contained inside a collection bin from being blown out of the collection bin. The method includes the following steps:
a) monitoring movement of a fork assembly on a waste collection vehicle;
b) generating an actuation command based on the step of monitoring the movement of the fork assembly thereby sending an actuation command to the actuation system; and
c) actuating the actuator system based on the actuation command from the switch. The step of actuating the actuator system moves a cover attached to the collection bin.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the claimed invention.

DESCRIPTION OF THE DRAWINGS

The following drawing figures, which form a part of this application, are illustrative of embodiments, systems, and methods described below and are not meant to limit the scope of the invention in any manner, which scope shall be based on the claims appended hereto.

DETAILED DESCRIPTION

Figure 1:
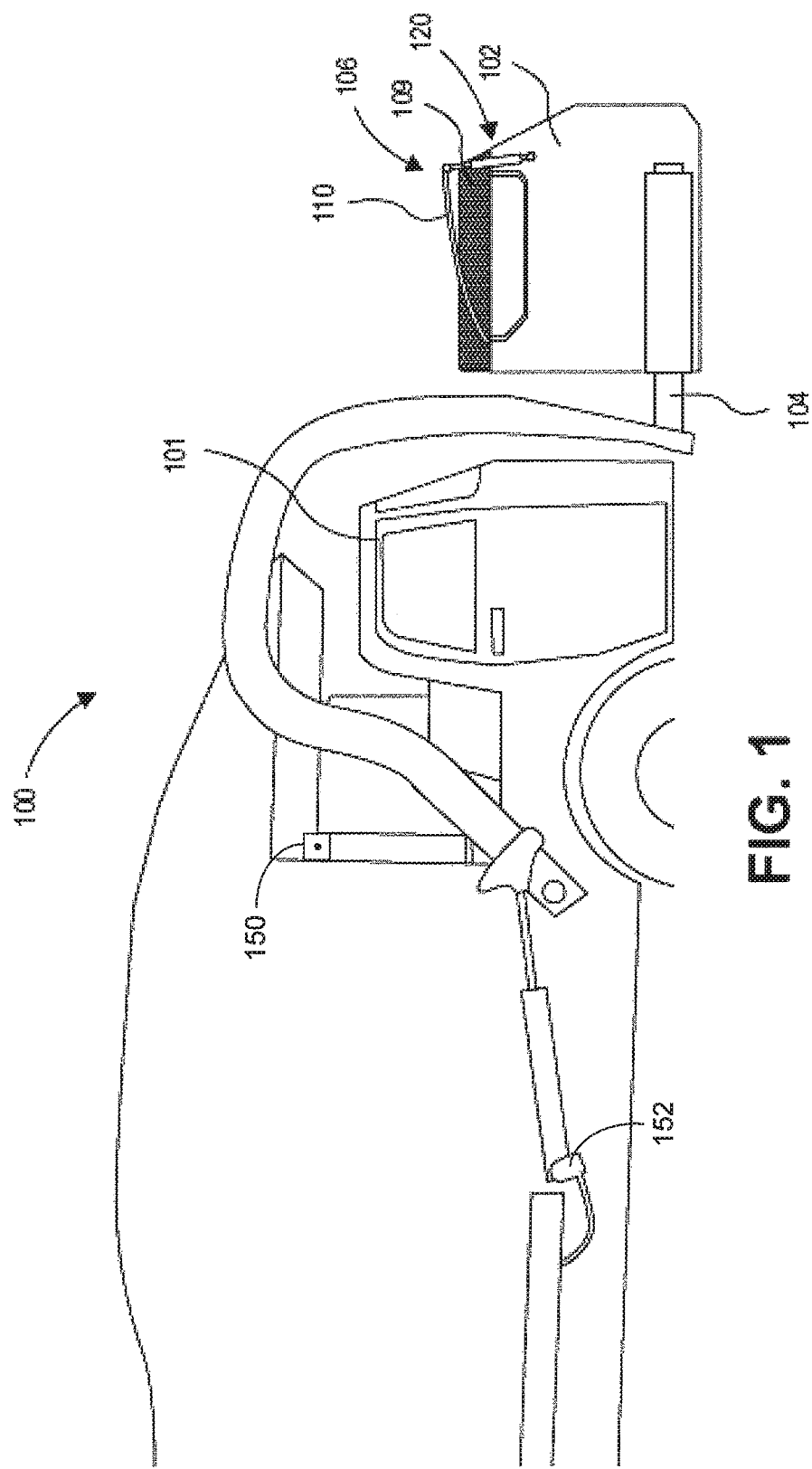
FIG. 1 is a side view of one embodiment of a collection system.

Although the techniques introduced above and discussed in detail below may be implemented in a variety of collection vehicles, the present disclosure will discuss the implementation of these techniques in the context of a collection vehicle for use in providing removal and transport of materials, such as waste and recyclables. The reader will understand that the technology described in the context of an automated cover for a collection bin could be adapted for use with other systems or vehicles.

Collection vehicles with collection bins are used to provide the removal and transport of items such as municipal solid waste, recyclables, dirt, rock, coal, minerals, green waste (e.g., yard waste), and/or any other material commonly collected and transported. While operating a collection vehicle with a collection bin, it is desirable to avoid unnecessary littering or loss of collected materials from the collection bin during use and/or transport. Accordingly, a collection vehicle with an automated cover is desirable.

An automated cover system as disclosed herein provides for a system that prevents unnecessary littering from the collection bin during use and/or transport between customers or when the intermediate bin is dumped into the hopper of the truck. The automated cover system or a collection bin and automated cover system may be self-contained. The cover can be opened and closed upon activation by an operator. In one embodiment, the cover can also be manually opened and, once manually opened, manually closed without activation by the operator. Accordingly, the automated cover system may require essentially no extra labor during use.

The automated cover system provides a cover for covering the contents of the collection bin. This cover prevents wind from entering the collection bin and blowing materials out of the collection/intermediate bin during use and/or transport. Accordingly, the automated cover system reduces and/or eliminates undesirable littering from the collection bin.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the scope of the equipment and methods described herein.

Reference will now be made in detail to various features of the present disclosure that are illustrated in the accompanying drawings. Wherever possible, the same reference numbers will be used throughout the drawings to refer to the same or like parts.

FIGS. 1-9 illustrate embodiments of a collection system 100. The collection system 100 comprises a waste collection vehicle (WCV) 101, a collection bin 102, and an automated cover system 106. The automated cover system 106 includes a cover 110, a pivot system 116, a drive system 118, and an actuator system 120. In one embodiment, the collection system 100 further comprises an automated robotic arm and/or a weighing system. In an alternative embodiment, not illustrated, the collection system 100 includes a side loading waste collection vehicle (WCV) instead of a front loading waste collection vehicle (WCV).

The materials collected may be waste, such as municipal solid waste, recyclables, dirt, rock, coal, minerals, green waste (e.g., yard waste), or any other material commonly collected and transported. As utilized herein, the terms "recyclables" or "waste" is not limiting and is understood to be interchangeable with any other material that is commonly collected and transported.

As illustrated, the front loading waste collection vehicle 101 comprises a vehicle that includes a hopper, an arm, and fork prongs 104 of a fork assembly. In one embodiment, the arm is referred to as automated because the attachment to the commercial waste container and/or the movement of the arm is automated or partially automated upon initiation by an operator. In one embodiment, the hopper may include a packing blade. Front loading WCVs 101 are typically configured to receive commercial waste containers with fork prongs 104 of a fork assembly on the front end of the waste collection vehicle. Side loading WCVs 101 typically equipped to receive commercial waste containers on the side of the waste collection vehicle. The fork prongs 104 are designed to engage standardized commercial waste containers (e.g., dumpsters). The forks prongs 104 are aligned with and inserted into pockets provided on commercial waste containers. The fork prongs 104 are lifted by the arm of the waste collection vehicle lifting the commercial waste container to dump the material contained in the commercial waste container into the hopper of the waste collection vehicle.

The collection bin 102 (or intermediate bin) of the collection system 100 is attached to the fork prongs 104 by any suitable method, such as welding and bolting. The collection bin 102 may be permanently attached or removably attached to the fork prongs 104 and/or the fork assembly.

Figure 6:
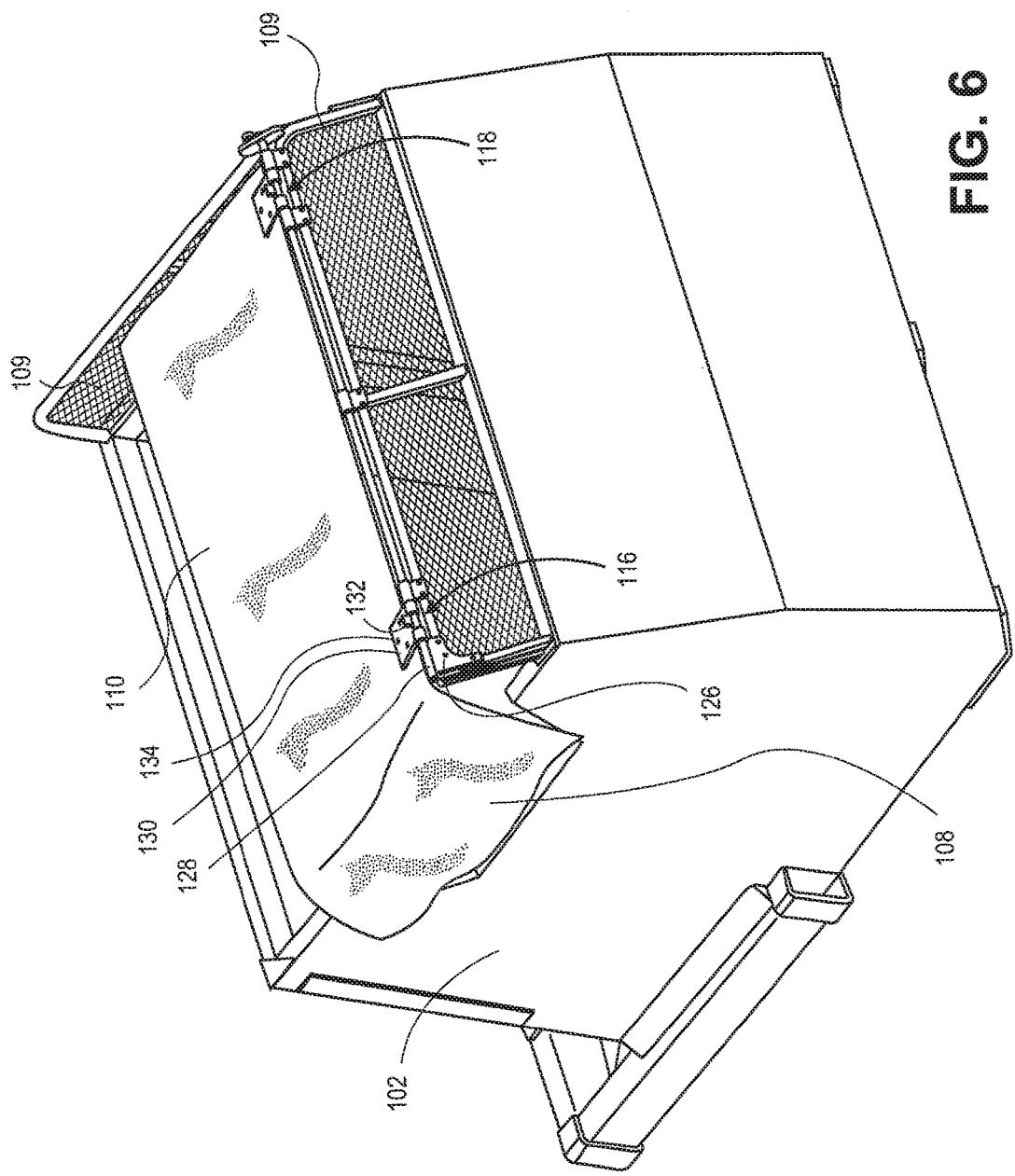
FIG. 6 is a perspective view of one embodiment of a collection bin and automated cover system.

In one embodiment, the collection bin 102 of the collection system 100 is attached to the fork prongs 104 by at least one pocket on the collection bin 102. A pocket is any suitable method for attaching a collection bin 102 to the fork prongs 104 of a WCV. As illustrated in FIGS. 1 and 6, in one embodiment, pockets are openings that align with the fork prongs 104 of the fork assembly of the front or side loading WCV 101. The collection bin 102 allows any front or side loading WCV 101 to be adapted to perform waste/material removal from non-commercial waste containers or smaller waste containers. Further, the collection system 100 may include a weighing system, which allows the collected materials to be weighed in the collection bin 102 and the weights associated with specific information/data.

In one embodiment, the collection bin 102 is a solitary structure. In an alternative embodiment, the collection bin 102 is structured in multiple parts. In one embodiment, the collection bin 102 has substantially two parts: a frame and a vessel or tub attached to the frame. As used herein the vessel/tub is any suitable container or holder for holding and/or collecting materials. The frame as used herein is any suitable device for allowing the vessel to be held by and/or attached to the fork prongs 104 of a waste collection vehicle 101. In one aspect of this embodiment, the two parts may be inseparable once combined. In another aspect of this embodiment, the two parts may be separable from each other even after combination.

In one embodiment, the frame includes at least one pocket. In another embodiment, a robotic arm is attached to the frame of the collection bin 102. In an embodiment, the frame further includes a weighing system comprising one or more load cells for weighing the contents of the collection bin 102.

Front and side loading WCVs 101 are typically designed for commercial waste containers, such as dumpsters. Commercial waste containers are typically sized to hold from about 1 cubic yard (about 0.7646 cubic meters) to about 10 cubic yards (about 7.646 cubic meters) of material. Front and side loaders are not designed for the automated lifting of non-commercial, residential, or smaller sized waste containers. Smaller sized waste containers typically hold from about 25 gallons (about 94.64 liters) to about 100 gallons (about 378.5 liters) of material. The collection bin 102 allows any front or side loading WCV 101 to be adapted to automatically load and empty waste containers.

Figure 2:
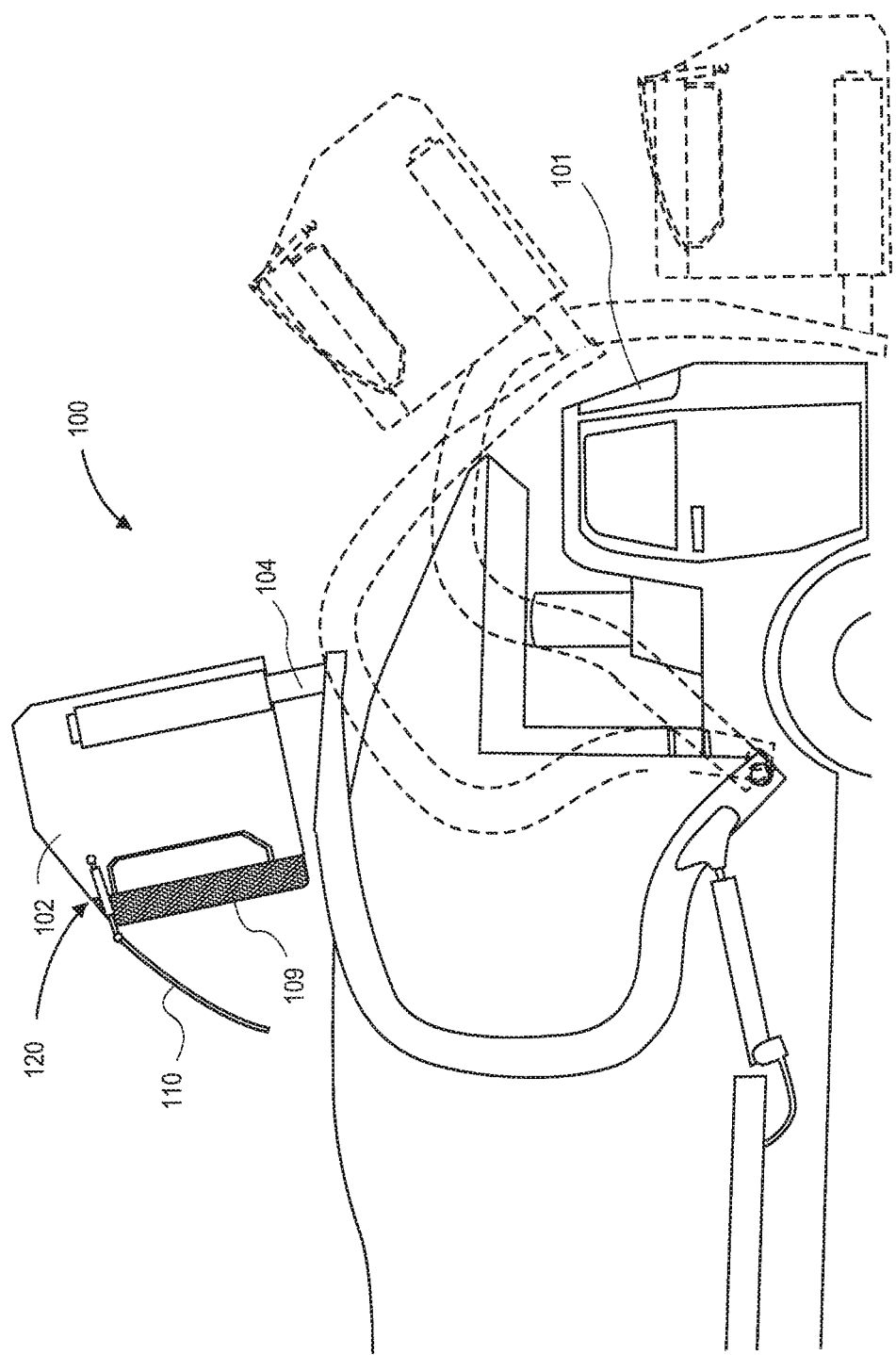
FIG. 2 is a side view of one embodiment of a collection system.

In one embodiment, the collection bin 102 is permanently attached to the fork prongs 104. The collection bin 102 may be attached to the fork prongs 104 by any suitable method, such as welding, bolting, chaining, or soldering. In another embodiment, the collection bin 102 is removable from the fork prongs 104, as illustrated in FIGS. 1 and 2. The collection bin 102 may be made of any suitable material for holding waste, recyclables or collectable materials, such as plastic, metal, vinyl, cloth, and/or fiberglass. In another embodiment, the collection bin 102 is designed to hold from about 1 cubic yard (about 0.7646 cubic meters) to about 10 cubic yards (about 7.646 cubic meters) of material. In a further embodiment, the collection bin 102 is designed to hold from about 3 cubic yards (about 2.294 cubic meters) to about 5 cubic yards (about 3.823 cubic meters) of material. These sizes are exemplary only and are not meant to limit the invention.

In one embodiment, the waste containers are manually lifted and emptied into the collection bin 102. In another embodiment, the waste containers are emptied into a collection bin 102 with a semi-automated cart tipper. In yet another embodiment, the collection system 100 further comprises an automated robotic arm attached to the collection bin 102. The robotic arm is referred to as automated because the grabbing, lifting, dumping, and setting down of the waste container by the robotic arm may be performed automatically upon the initiation of the actions by an operator command or a predetermined trigger. The automated robotic arm may be any suitable robotic arm for the automated grabbing, lifting, and emptying of waste containers. The automated robotic arm may be made of any suitable materials for the automated grabbing, lifting, and emptying of waste containers, such as plastic, metal, and/or rubber. In one embodiment, the collection bin 102 and/or the robotic arm may be any of the types disclosed in U.S. Pat. No. 7,210,890 filed on Oct. 16, 2003. In one embodiment, the automated robotic arm is powered by utilizing systems already implemented on the WCV, such as a power system, a hydraulic system, and/or a pneumatic system. In an additional embodiment, the automated robotic arm grabs, lifts, and disposes of any type/shape of waste container or any bulky item, such as furniture, appliances, barrels, or crates.

As discussed above, the automated cover system 106 includes a cover 110, a pivot system 116, a drive system 118, and actuator system 120. In one embodiment, the automated cover system 106 may further include a flap 112, a power source, a side-cover 108, and/or a side-wall cover 109.

The automated cover system 106 is referred to as automated because the opening and closing of the cover 110 may be performed automatically upon the initiation of the actions by an operator command or a predetermined trigger. In some embodiments, the automated cover system 106 is triggered to open and/or close by the pressing of a button or the pulling of a lever by the operator. In some embodiments, the automated cover system 106 is triggered to open or close via a switch 150. For example, the switch 150 may be a whisker switch 150 or a proximity switch 150. The switch 150 may be activated based on the location, position, and/or angle of the fork assembly, fork prongs 104, and/or collection bin 102. For example, the automated cover system 106 may automatically open the cover 110 when the fork prongs are in a base position as illustrated in FIG. 1 and automatically close when moved by a predetermined amount from this base position.

In one embodiment, the automated cover system 106 is self-contained. As used herein the term "self-contained" refers to a system that is not operatively coupled or at most has one operative coupling to the waste collection vehicle 101, such as a power source connector 138. In another embodiment, a collection bin and automated cover system is self-contained. The self-contained automated cover system 106 provides for interchangeability between collection bins 102. In another embodiment, the self-contained automated cover system 106 has a power supply and does not utilize any power from the WCV or collection bin 102. The automated cover system 106 may utilize any suitable type of power, such as electric, solar, gas, and/or hydraulic power.

The cover 110 is any suitable material for covering the collection bin 102 and for preventing the collected materials from blowing out of the collection bin 102 during use and/or transport. In one embodiment, the cover 110 is plastic, fabric, metal, wood, and/or combinations thereof. In another embodiment, the cover 110 is a woven fabric material.

A fabric cover 110 provides several advantages. For instance, the fabric is light weight and can be moved with less energy. Further, the fabric is not rigid and can substantially cover and/or lay across uneven or even materials contained inside the collection bin 102 even when portions of the materials extend above the height of the collection bin 102. Fabric covers 110 can also be inexpensive and easily replaced if damaged. The cover 110 may be further treated and/or designed as desired to withstand outdoor elements, such as extreme temperatures, sun exposure and water exposure. In another embodiment, the cover 110 may be water proof and/or fire proof. Further, a fabric cover 110 may include small holes, which allow air to travel through the cover 110. Additionally, if the collection bin 102 or hopper is overfilled, a fabric cover 110 will not break when abutted by this extra material due to the flexibility of the fabric.

Figure 5:
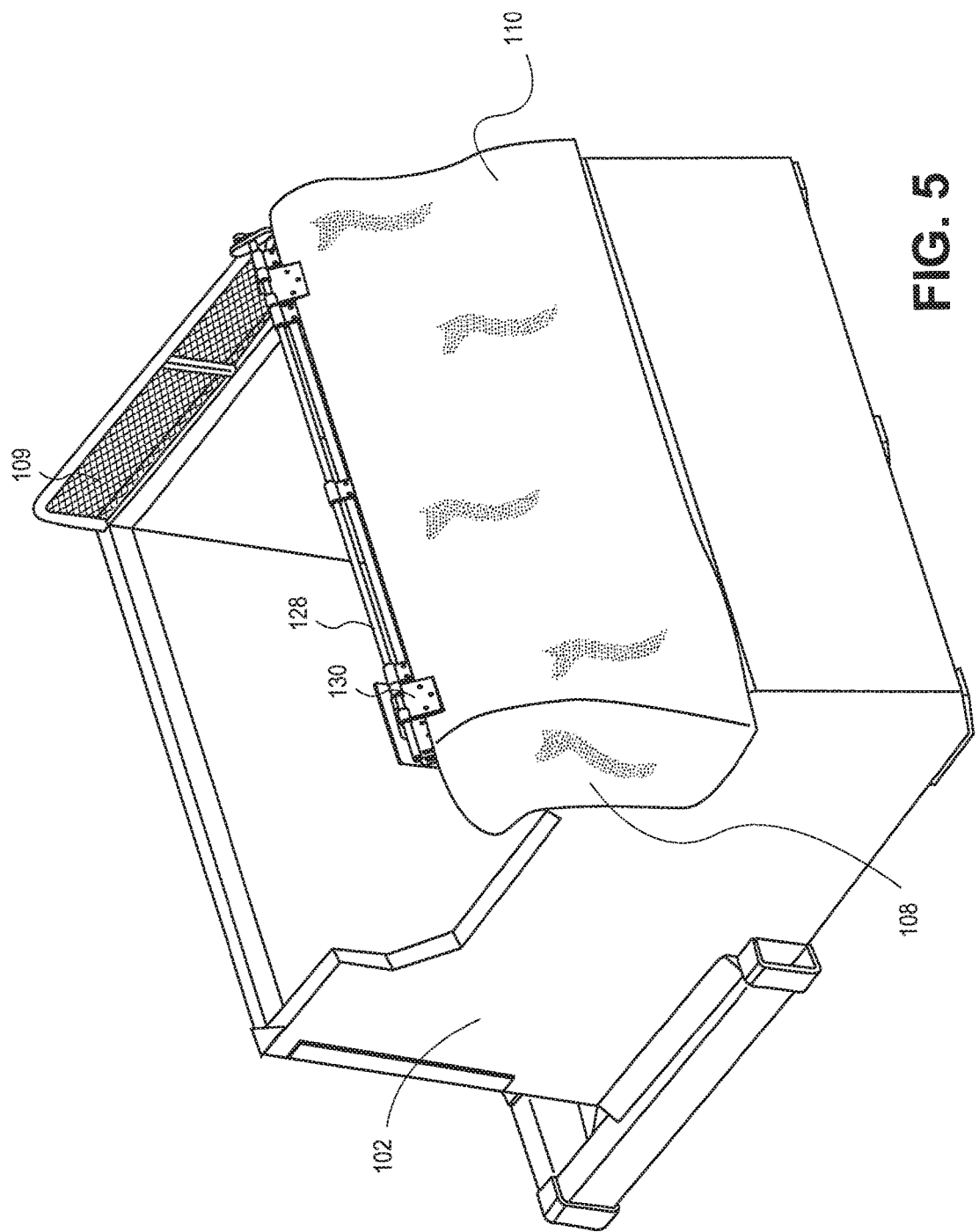
FIG. 5 is a perspective view of one embodiment of a collection bin and automated cover system.
Figure 9:
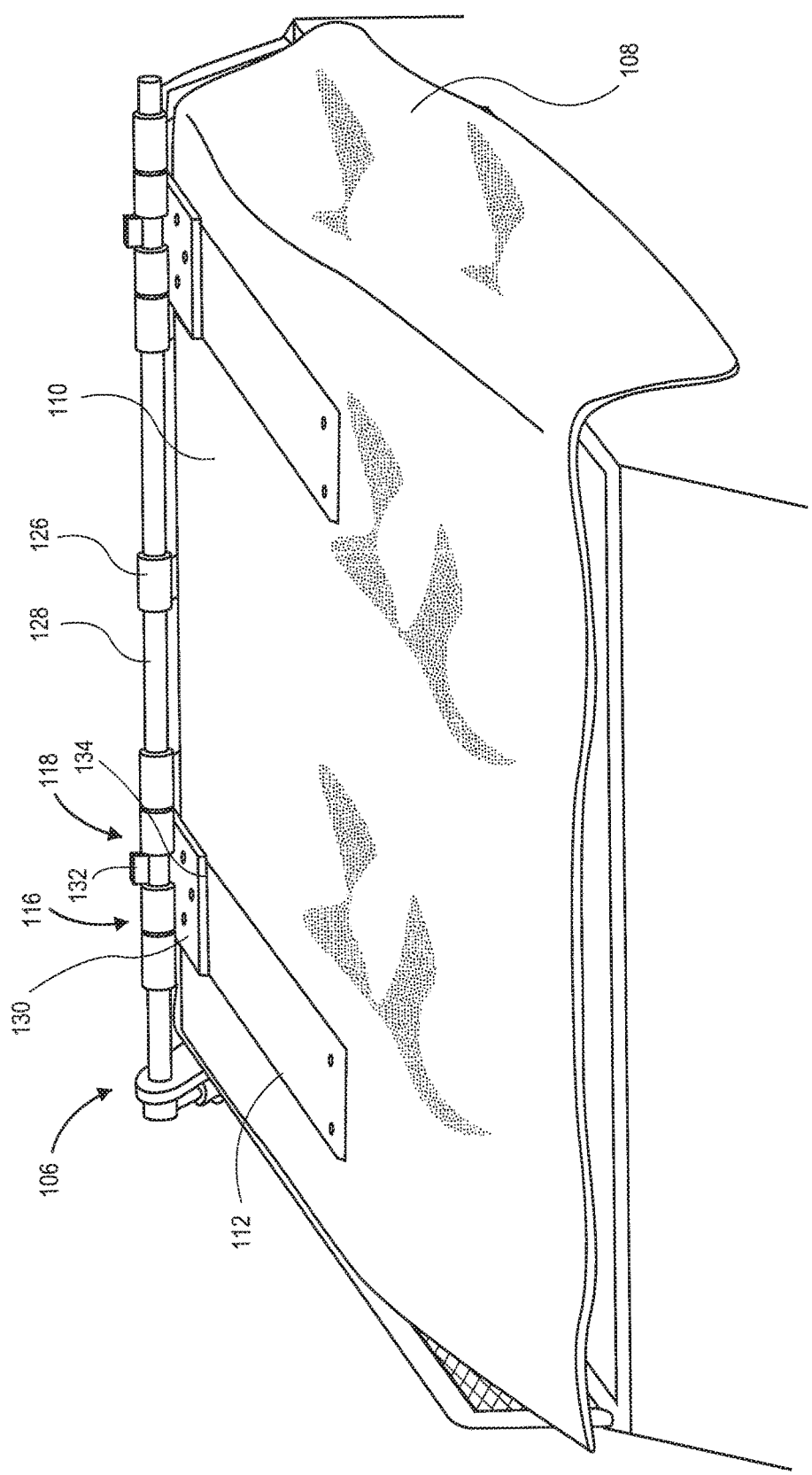
FIG. 9 is a partial rear view of one embodiment of a collection bin and automated cover system.

In one embodiment, the cover 110 further includes a side-portion creating a side-cover 108. A cover 110 with a side-cover 108 is wider than the collection bin 102, as illustrated in FIGS. 5, 6, and 9. This extra width is typically made from a semi-flexible material. As the cover 110 is closed, the flexible side-portion bends over the side of the collection bin 102. This side-cover 108 prevents materials contained inside the collection bin 102 from being blown out between the side of the collection bin 102 and the cover 110 during use and/or transport.

In another embodiment, automated cover system 106 includes a side-wall cover 109. The side-wall cover 109 is a piece of material attached to one or more sides of the collection bin 102 to increase the height of one or more sides of the collection bin 102. This side-wall cover 109 also prevents materials contained inside the collection bin 102 from being blown out between the side of the collection bin 102 and the cover 110 during use and/or transport, such as a windscreen. As illustrated in FIGS. 1-8, in one embodiment, the side-wall cover 109 is bolted to at least one side of the collection bin 102 and extends several inches past the original height of the side of the collection bin 102. The side-wall cover 109 may be made of any suitable material, such as metal, plastic, and/or wood for providing extra wind protection. The side-wall cover 109 may be flexible, semi-flexible, or rigid. In some embodiments, the side-wall cover 109 is a rigid windscreen.

In some embodiments, the flap 112 is utilized in automated cover systems 106 with a flexible cover 110. The flap 112 provides added structure to the flexible cover materials, such as fabrics, fiber materials, and soft plastics. However, the flap 112 can be utilized with other more rigid cover materials.

Figure 12:
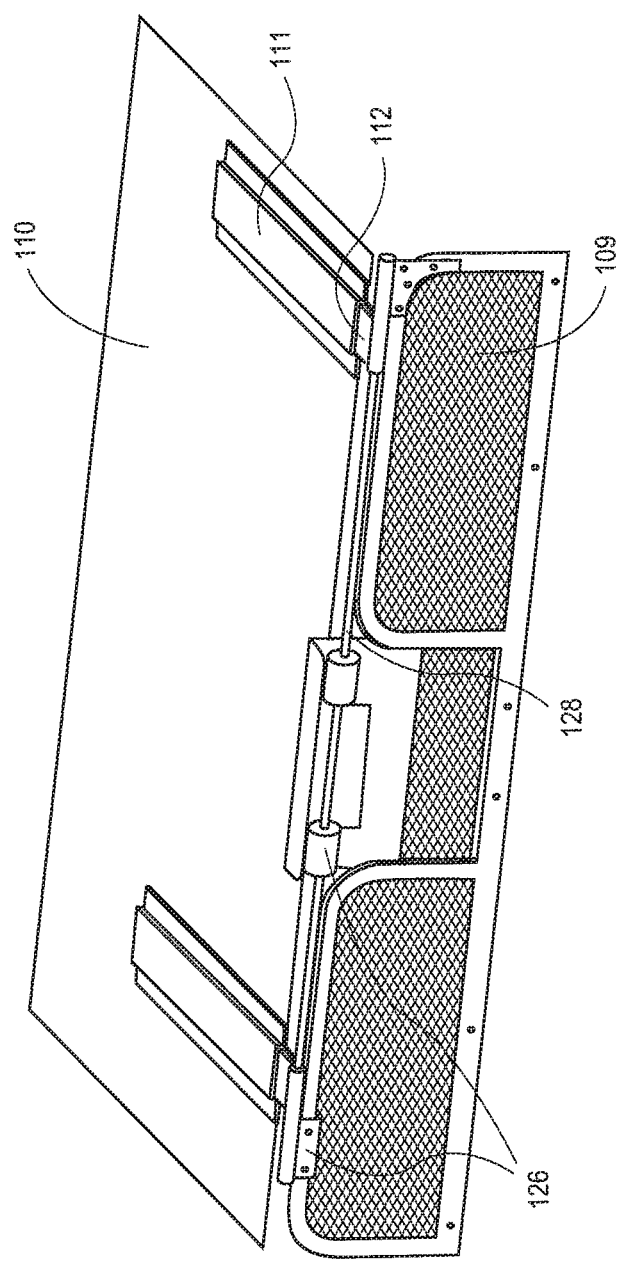
FIG. 12 is a partial view of one embodiment of an automated cover system.

The flap 112 is adjacent to the cover 110. The flap 112 may be above, below, or within the cover 110. In one embodiment, the flap 112 is connected to the cover 110. In some embodiments, the flap 112 is inserted into a sleeve or pocket 111 sewn into the cover 110 as illustrated in FIG. 12. The flap 112 may be connected to the cover 110 by any suitable method for maintaining the connection between the cover 110 and the flap 112 during use of the automated cover system 106. In one embodiment, the flap 112 is attached to the cover 110 via plastic ties. In another embodiment, the flap 112 is bolted and/or stapled to the cover 110. In yet another embodiment, the flap 112 is welded to the cover 110.

The flap 112 may be made of any suitable semi-rigid material, such as plastic. One or multiple flaps 112 may be utilized. The flap 112 may be any suitable size, length, and shape to provide the desired amount of structure to the cover material. For instance, the flap 112 may extend the entire length of the cover 110 or extend over only a portion of the cover 110. In one embodiment, the flap 112 extends the entire length of the cover 110. In another embodiment, the flap 112 extends across about a third of the cover 110. In an additional embodiment, the flap 112 is in a flat rectangular shape. In yet another embodiment, two flaps 112 are bolted to the underside of a cover 110. In a further embodiment, three flaps 112 are attached to the top-side of the cover 110 via plastic ties.

The pivot system 116 is a mechanism that movably attaches the cover 110 and/or flaps 112 to the collection bin 102. The pivot system 116 allows the cover 110 to pivot to and from an open position and a closed position. The pivot system 116 may be any suitable system for allowing the cover 110 to open and close, such as a hinge and/or any other mechanism that is suitable for providing movement around an axis.

In one embodiment, the pivot system 116 includes an anchor portion 126, a rotatable bar 128, and moveable portion 130. The anchor portion 126 provides an attachment system for attaching the rotatable bar 128 to the vessel and/or frame of the collection bin or intermediate bin 102. In some embodiments, the anchor portion 126 is attached to a side-wall cover 109, such as a windscreen, for attaching the rotatable bar 128 to the collection bin 102, as illustrated in FIGS. 4, 6, 7, 8, and 11. Utilizing the anchor portion 126 to attach to a side-wall cover 109, such as a windscreen, to the rotatable bar 128 is equivalent to attaching the rotatable bar 128 to the frame and/or vessel of to the collection bin 102. The attachment system or anchor portion 126 may be any suitable mechanism for attaching the rotatable bar 128 to the collection bin 102, such as welding and bolting. The anchor portion 126 is not movable once attached and provides, in this embodiment, the anchor for the pivot system 116. However, the anchor portion's attachment to the rotatable bar 128 locks the rotatable bar 128 into one position while allowing the rotatable bar 128 to rotate in either direction around an axis.

The moveable portion 130 of the pivot system 116 is movably attached to the rotatable bar 128. The moveable portion 130 rotates around the rotatable bar 128 on one axis in either direction. The moveable portion 130 and the rotatable bar 128 can rotate simultaneously or individually in the same or different directions. The moveable portion 130 is attached to the cover 110 and/or flap 112 if utilized. The moveable portion 130 may be attached to the cover 110 and/or flap 112 by any suitable means, such as welding and bolting.

In an alternative embodiment, the moveable portion 130 does not rotate around the rotatable bar 128. In this embodiment, the moveable portion 130 moves with the rotation of the rotatable bar 128, as illustrated in FIG. 12. Since the moveable portion 130 is attached to the cover 110 and/or flap 112, the cover 110 opens and closes with the rotation of the rotatable bar 128.

Figure 3:
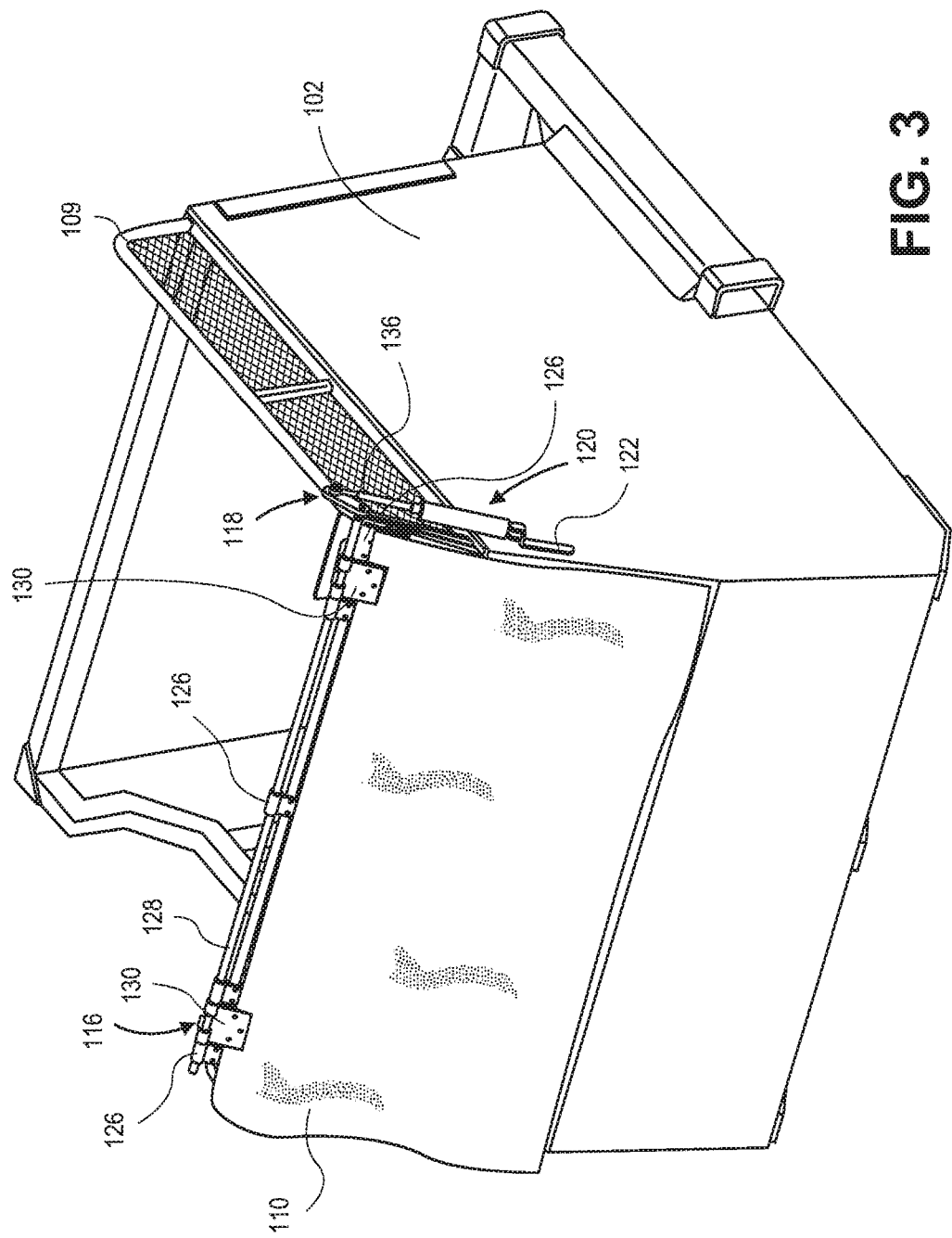
FIG. 3 is a perspective view of one embodiment of a collection bin and automated cover system.
Figure 4:
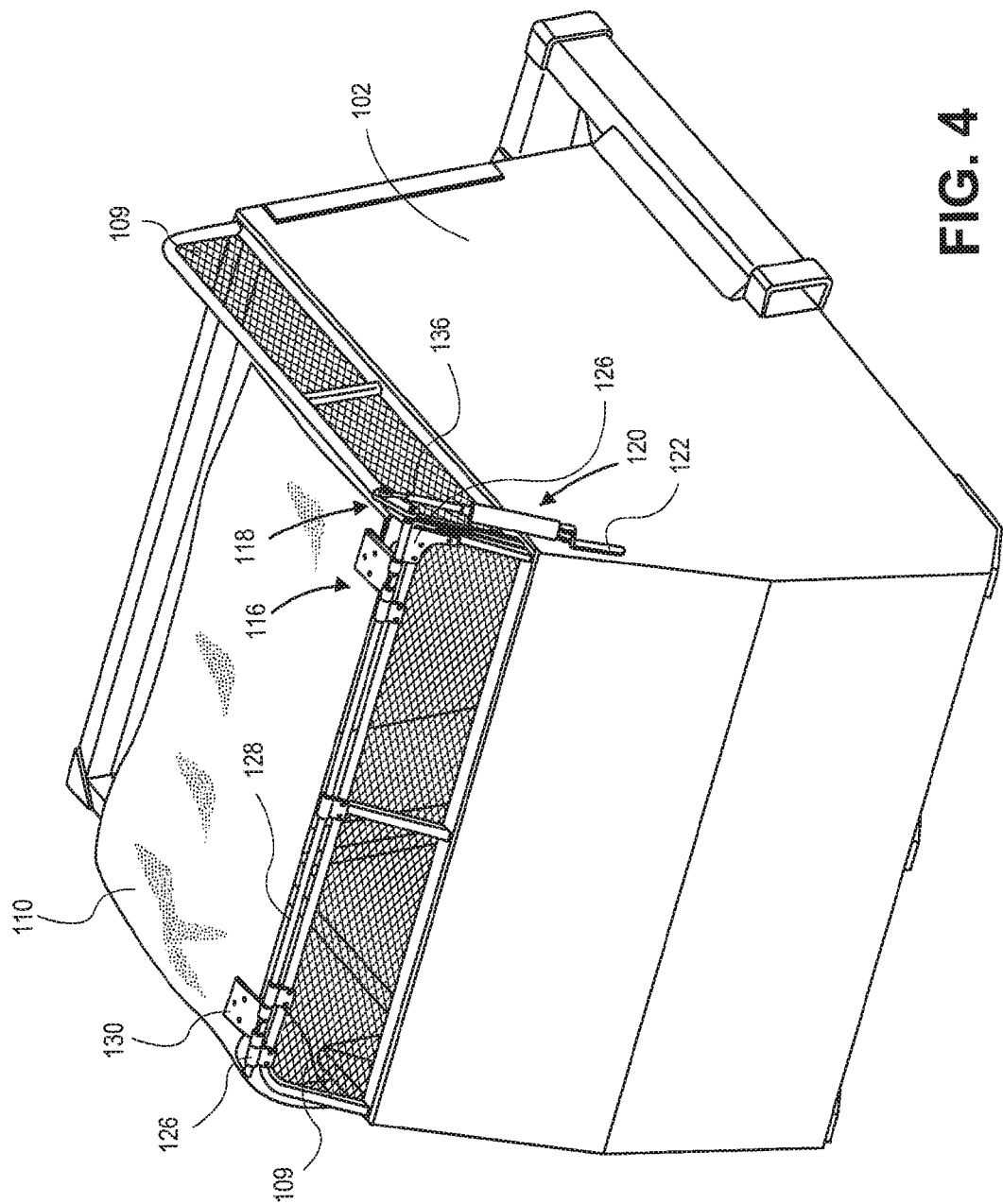
FIG. 4 is a perspective view of one embodiment of a collection bin and automated cover system.
Figure 7:
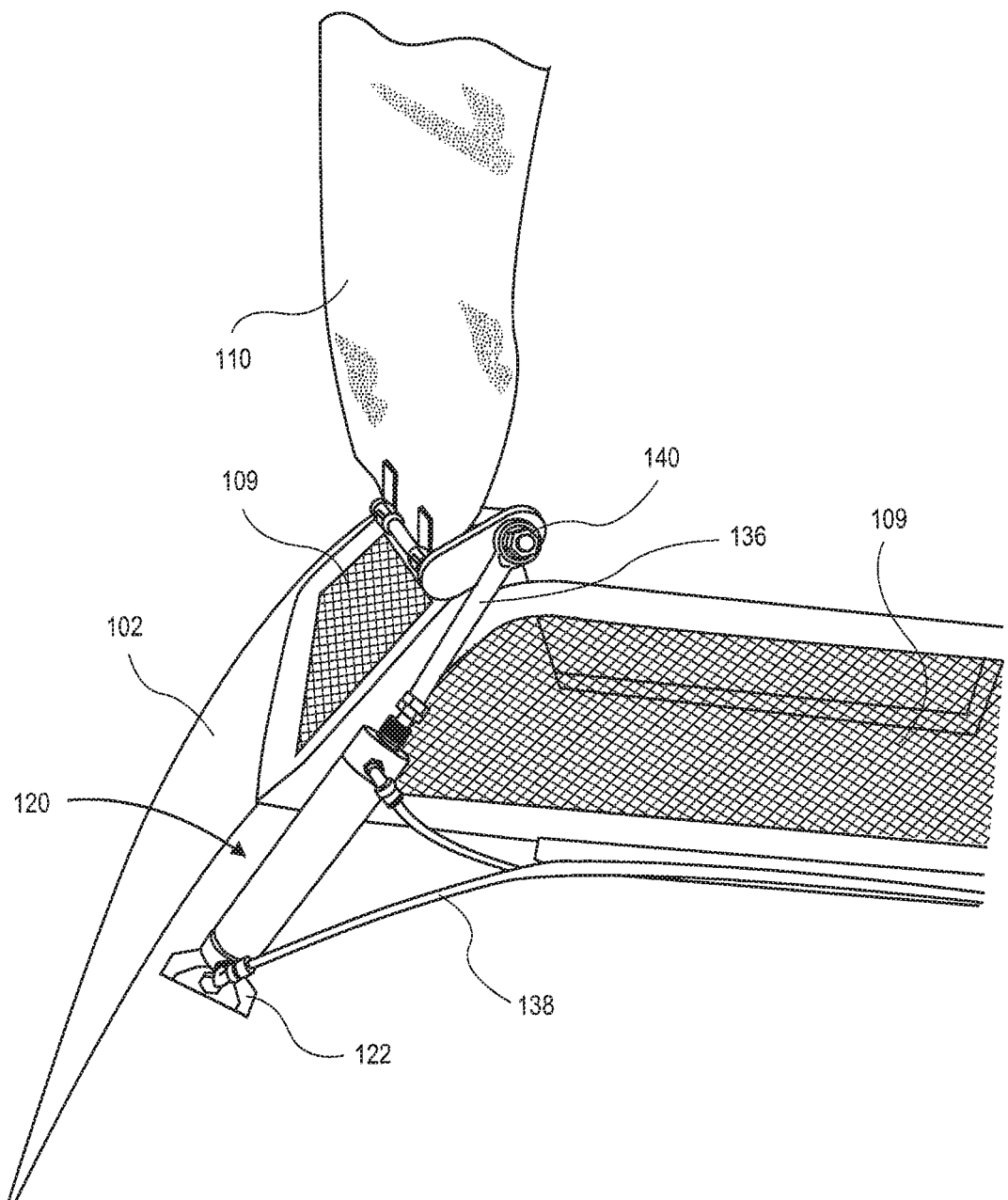
FIG. 7 is a partial perspective view of one embodiment of a collection bin and automated cover system.
Figure 8:
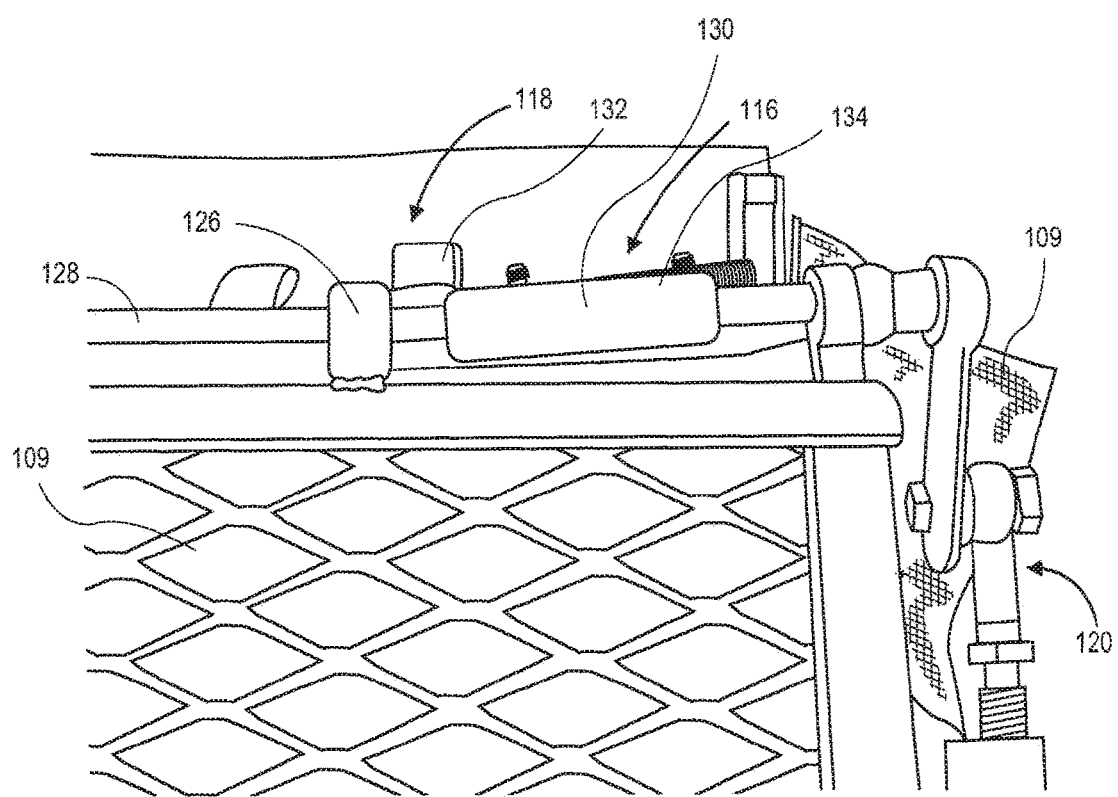
FIG. 8 is a partial front view of one embodiment of a collection bin and automated cover system.

The drive system 118 of the automated cover system 106 includes any suitable system for translating the energy or motion from the actuator system 120 into a force or motion suitable for rotating the rotatable bar 128, as illustrated in FIGS. 3, 4 and 8. The drive system 118 may be any suitable drive system 118, such as a cam system, a lever system, a ratchet and pawl system, a rack and pinion system, and/or a gear system 140 (as illustrated in FIG. 7). For example, in some embodiments, the drive system 118 is a coupling system, such as Lovejoy couplings (The company of Lovejoy is headquartered at 2655 Wisconsin Ave., Downers Grove, Ill. 60515).

In one embodiment, the drive system 118 is a cam system, which includes a cam 132 and cam follower 134, as illustrated in FIGS. 3, 4, 6, 8, and 9. The cam system may be utilized to automatically open and close the cover 110 upon activation of the operator. However, the cam system can also be designed to allow a closed cover 110 of an automated cover system 106 to open manually. Further, this configuration also allows the cover 110 to open upon the force of gravity when collection bin 102 is lifted by the arm of the waste collection vehicle and turned upside down, as illustrated in FIG. 2. Once opened, the cover 110 may be closed utilizing manual force and/or gravity. Accordingly, the cover 110 may open upon dumping without utilizing the automated cover system 106.

In an alternative design, the automated cover system 106 is configured to prevent the movement of the cover 110 without initiation of the drive system 118, as illustrated in FIGS. 4 and 7. In this embodiment, if a fabric cover 110 is utilized, the collection bin 102 may be dumped into the hopper without opening the cover 110. In this embodiment with a fabric cover 110, while the cover 110 remains locked in a closed position, the material contained in the intermediate bin 102 simply bends the closed fabric cover 110 out of the way to fall into the hopper. Accordingly, the automated cover 110 does not need to be opened to release the material into the hopper during dumping of the collection bin 102.

In one aspect of this embodiment, the cam 132 is attached to the rotatable bar 128 as illustrated in FIGS. 6, 8, and 9. Accordingly, the cam 132 rotates with the rotation of the rotatable bar 128. The cam 132 is positioned to abut a cam follower 134 during rotation. In one embodiment, the cam follower 134 is attached to the moveable portion 130 or is part of the moveable portion 130 of pivot system 116, as illustrated in FIGS. 6, 8, and 9.

In this aspect, as the cam 132 rotates with the rotatable bar 128, the cam 132 runs into the cam follower 134 pushing against the cam follower 134 causing the cam follower 134 to move in the direction of the rotation. Since the cam follower 134 is either attached to the moveable portion 130 or is a portion of the moveable portion 130, the movement of the cam follower 134 causes the moveable portion 130 to pivot around the rotatable bar 128. Because the moveable portion 130 of the pivot system 116 is attached to the cover 110 and/or flap 112, this motion causes the cover 110 and/or flap 112 to rotate in the same direction around the rotatable bar 128. Depending upon the direction of this motion, this motion will cause the cover 110 to open or close. Therefore, one cam 132 may be utilized to open and close the cover 110. For example, when the cam 132 rotates in a first direction, the cam 132 will cause the cover 110 to open. When the cam 132 rotates in the opposite direction, the cam 132 will cause the cover 110 to close by abutting the opposite side of the cam follower 134. The cam 132 must rotate on the rotatable bar 128 in the necessary direction for the desired movement until the cam 132 reaches and pushes upon the cam follower 134.

In another aspect of this embodiment, at least two cams 132 are attached to the rotatable bar 128 (this aspect is not illustrated). In this aspect of this embodiment, at least one cam 132 is rotated on the rotatable bar 128 to open the cover 110. When the cover 110 is open, at least one different cam 132 is rotated in the opposite direction on the rotatable bar 128 and abuts a cam follower 134 on the moveable portion 130 or attached to the moveable portion 130 to close the cover 110.

In yet another aspect of this embodiment, the cam 132 is attached to the actuator system 120 and the cam follower 134 is attached to the rotatable bar 128 (this aspect is not illustrated). In this embodiment, the cam 132 moves upon actuation and abuts the cam follower 134 on the rotatable bar 128 causing the rotatable bar 128 to move via the cam follower 134 movement. Actuation in the same or opposite direction may cause the cam 132 to abut a different or the same cam follower 134 attached to the rotatable bar 128 to move the cover 110 in the opposite direction. In an alternative embodiment of this aspect, a different cam 132 may be utilized to abut a different or the same cam follower 134 attached to the rotatable bar 128 to move the cover 110 in the opposite direction.

Figure 11:
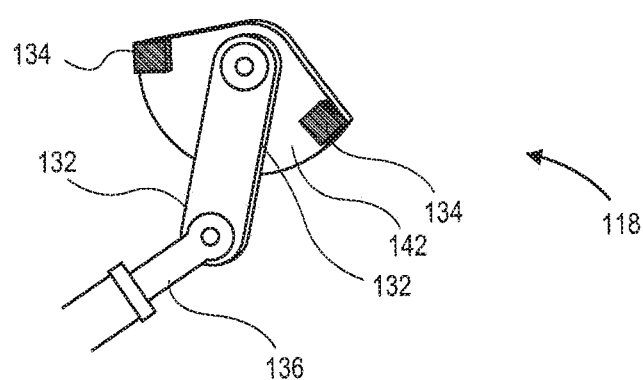
FIG. 11 is a partial view of one embodiment of an automated cover system.

In another embodiment, a rotatable component 142 is attached to the rotatable bar 128 adjacent to the actuator system 120, as illustrated in FIG. 11. In this embodiment, the cover 110 rotates with the rotation of the rotatable bar 128. The rotatable component 142 is welded to the rotatable bar 128 and rotates with the rotatable bar 128. The rotatable component 142 includes two cam followers 134. In this embodiment, the actuator system 120 includes two cams 132. As the actuator system 120 extends, a first cam 132 on the actuator system 120 abuts a first cam follower 134 on the rotatable component 142 causing the rotatable component 142 to rotate. Because the rotatable component 142 is welded to the rotatable bar 128, the rotatable bar 128 rotates with the rotation of the rotatable component 142. In this embodiment, because the cover 110 rotates with the rotatable bar 128, the rotation of the rotatable component 142 also causes the cover 110 to open. As the actuator system 120 retracts, a second cam 132 on the actuator system 120 abuts a second cam follower 134 on the rotatable component 142 causing the rotatable component 142 to rotate in the opposite direction. Accordingly, the opposite rotation of the rotatable component 142 causes the rotatable bar 128 to rotate in the opposite direction causing the cover 110 to close.

Figure 10:
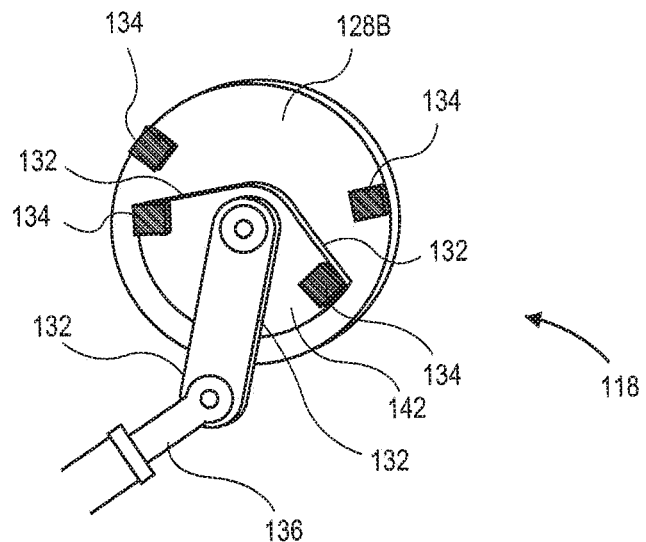
FIG. 10 is a partial view of one embodiment of an automated cover system.

In an alternative embodiment, the rotatable component 142 pivots on the rotatable bar 128 and is not welded to the rotatable bar 128, as illustrated in FIG. 10. In this embodiment, the rotatable component 142 further includes two cams 132, which abut two cam followers 134 on the rotatable bar 128. In this embodiment, the rotatable bar includes an end piece 128B on the end of the rotatable bar 128. This end piece 128B rotates with the rotatable bar 128. In this embodiment, the first cam 132 of the actuator system 120 abuts the first cam follower 134 of the rotatable component 142 as the actuator system 120 extends causing the rotatable component 142 to rotate in one direction around the rotatable bar 128. As the rotatable component 142 rotates the first cam 132 on the rotatable component 142 abuts against the first cam follower 134 on the end piece 128B of the rotatable bar 128 and causes the rotatable bar 128 to rotate and open the automated cover 110. As the actuator system 120 retracts the second cam 132 on the actuator system 120 abuts the second cam follower 134 on the rotatable component 142 and causes it to rotate in the opposite direction. As the rotatable component 142 rotates in the opposite direction a second cam 132 on the rotatable component 142 abuts against a second cam follower 134 on the end piece 128B of the rotatable bar 128 causing the rotatable bar 128 to rotate in the opposite direction closing the automated cover 110.

In another embodiment, the drive system 118 uses a gear system 140 instead of a cam system to drive the movement of the cover 110, as illustrated in FIG. 7. The gear system 140 may be utilized when the moveable portion 130 is attached to the rotatable bar 128 and is not designed to rotate around the rotatable bar 128. In this embodiment, the cover 110 rotates with the rotation of the rotatable bar 128. The actuator system 120 is moveably attached via the gear system 140 to the rotatable bar 128. In one aspect, the actuator system 120 is movably attached via the gear system 140 to a handle extending from rotatable bar 128, as illustrated in FIG. 7. As the actuator system 120 extends, the gear system 140 moves the rotatable bar 128 causing the rotatable bar 128 to rotate. Accordingly, as the actuator system 120 retracts, the gear system 140 moves the rotatable bar 128 in the opposite direction causing the rotatable bar 128 to rotate in the opposite direction. Since the cover 110 opens and closes with the rotation of the rotatable bar 128, the extension and retraction of the actuator system 120 opens and closes the cover 110. Further, in this embodiment, the cover cannot be manually opened or closed. Additionally, in this embodiment, the cover cannot be opened or closed with force of gravity.

The actuator system 120 is any suitable system for converting energy into movement of an actuator 136 upon the initiation of the actions by an operator command or a predetermined trigger. The actuator system 120 is moveably coupled to the drive system 118 and/or rotatable bar 128. The term "moveably coupled" as utilized herein refers to a moving interaction between two separate or attached components.

The actuator system 120 includes a power source connector 138. The power source connector 138 transmits power from a power source 152 to the actuator system 120. As discussed above, the automated cover system 106 can include a power source 152 or the automated cover system 106 may connect to a power source 152 located on the collection bin 102 and/or waste collection vehicle 101.

The actuator system 120 also includes a mounting system 122 for attaching the actuator system 120 to the collection bin 102. The mounting system 122 can be any suitable mechanism for attaching the actuator system 120 to the collection bin 102, such as a welding system or a bolting system.

The actuator system 120 may be a hydraulic, electric, pneumatic, and/or gas powered system or any other suitable power system for powering the actuator system 120. In one embodiment, the actuator system 120 is a hydraulic system that includes a hydraulic cylinder that extends and retracts an arm 136 that is moveably coupled to the rotatable bar 128. For example, in some embodiments, the actuator system is a rotary air cylinder. In embodiments that utilize a rotary air cylinder, the air for the air cylinder may be supplied via the waste collection vehicle. For example, the waste collection vehicle may supply between 90-120 psig of air to a rotary air cylinder.

In another embodiment, the actuator system 120 is a hydraulic piston assembly that extends and retracts an arm 136 that is moveably coupled to the rotatable bar 128. In these embodiments, the extension of arm 136 causes the rotatable bar 128 to rotate in one direction. The retraction of the arm 136 causes the rotatable bar 128 to rotate in the opposite direction. In another embodiment, the extension of the arm 136 causes the rotatable bar 128 to rotate in either direction depending upon the position of the cover 110 and/or rotatable bar 128. Accordingly, the extension of the arm 136 causes the cover 110 to open, when in a closed position and causes the cover 110 to close when in an open position. In one embodiment, the arm 136 of the actuator system 120 is separate from the rotatable bar 128. In this embodiment, the extension and retraction of the arm 136 causes the arm 136 to abut at least one cam 132 located on the rotatable bar 128 or an intermediate component, such as a rotatable component 142.

Figure 13:
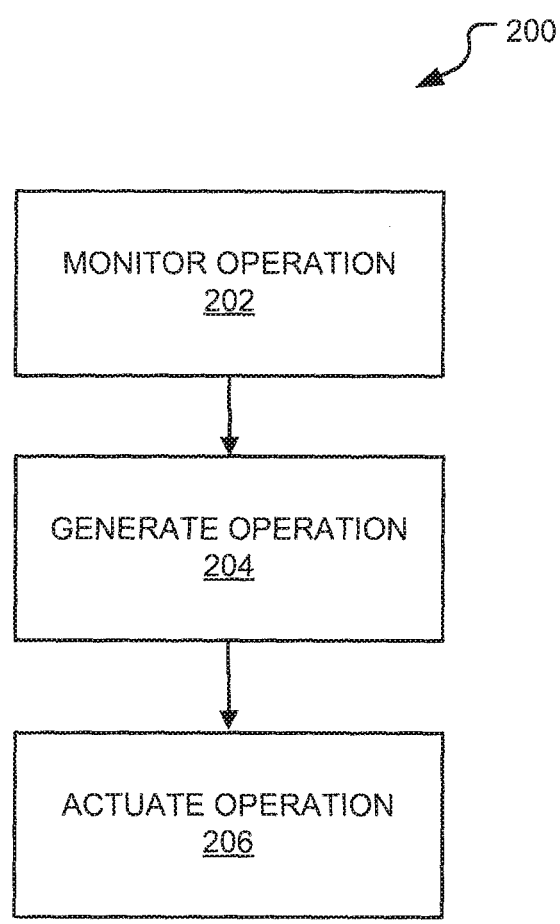
FIG. 13 is one embodiment of a method for preventing material contained inside a collection bin from being blown out of the collection bin.

FIG. 13 illustrates an embodiment of a method 200 for preventing material contained inside a collection bin from being blown out of the collection bin. As illustrated, method 200 includes a monitor operation 202. During the monitor operation 202, a waste collection vehicle monitors the movement of a fork assembly on a waste collection vehicle. In some embodiments, the monitor operation 202 determines if the fork assembly is moved to a position for transport. In some embodiments, the monitor operation 202 determines if the fork assembly is moved to a position that allows the collection bin to be filled. In some embodiments, the monitor operation 202 determines if the fork assembly is moved to a position that allows the collection bin to be emptied into the hopper.

In some embodiments, the movement of the fork assembly is monitored via switch on the fork assembly. In some embodiments, the switch is a whisker switch or a proximity switch. In some embodiments, only a specific movement of the fork assembly will activate the switch. For example, the switch may be activated when the fork assembly reaches or passes a specific position or location. In some embodiments, the switch is activated when the fork assembly moves in a different direction from a previous movement, such as a change from an upward movement to a downward movement. In some embodiments, the switch may monitor for different positions of the fork assembly.

Further, method 200 includes a generate operation 204. During the generate operation 204, a waste collection vehicle generates an actuation command based on the monitoring of the movement of the fork assembly thereby sending an actuation command to the actuation system. For example, the actuation command may be generated when a switch is activated. In some embodiments, the actuation command may be generated during the generate operation 204 by the waste collection vehicle when the waste collection vehicle during the monitoring step 202 detects that the fork assembly passes a specific position, has a specific angle, is in a specific location, changes direction, and/or moves to a specific position. The waste collection vehicle during the generate operation 204 sends an actuation command to the actuation system via any suitable means for communicating between a switch and an actuation system. In some embodiments, the command is sent or communicated using wired media such as a wired network or direct-wired connection, and/or using wireless media such as acoustic, RF, infrared and other wireless media.

Next, method 200 includes an actuate operation 206. The waste collection vehicle during the actuate operation 206 actuates the actuator system based on the actuation command. The step of actuating the actuator system moves a cover attached to the collection bin. The actuation of the actuator system opens and/or closes the cover. The actuator system is any suitable system for converting energy into movement of an actuator. The actuator system is moveably coupled to a drive system and/or a rotatable bar. The actuator system may be a hydraulic, electric, pneumatic, and/or gas powered system or any other suitable power system for powering the actuator system. In one embodiment, the actuator system is a hydraulic system that includes a hydraulic cylinder that extends and retracts an arm that is moveably coupled to the rotatable bar. In some embodiments, the actuator system is a rotary air cylinder.

In some embodiments, method 200 further includes an operator operation. During the operator operation, the waste collection vehicle actuates the actuator system based on a command received from an operator selected trigger. For example, the operator may electronically select or manually push a button to actuate the actuator system. Accordingly, in some embodiments, the cover may be opened and closed via a switch and operator selection. As discussed above, the step of actuating the actuator system moves a cover attached to the collection bin.

In some embodiments, method 200 further includes a manual operation. During the manual operation, the waste collection vehicle allows the operator to manually move the cover attached to the collection bin. For example, the operator may manually open or close the cover on the collection bin. Accordingly, in some embodiments, the cover may be opened and closed via a switch, operator selection, and/or manual force. In an alternative embodiment, the cover on the collection bin cannot be manually opened.

In one embodiment, the steps of method 200 are performed by the waste collection system and the automated cover system illustrated in FIGS. 1-12 and described above. In some embodiments, the steps of method 200 are performed by a computer-readable medium having computer-executable instructions. In other embodiments, the collection bin with and automated cover system includes means for performing the steps of method 200. The means for performing the steps of method 200 are disclosed above, such as the waste collection system and the automated cover system illustrated in FIGS. 1-12 and described above.

Those skilled in the art will recognize that the methods and systems of the present disclosure may be implemented in many manners and as such are not to be limited by the foregoing exemplary embodiments and examples. In this regard, any number of the features of the different embodiments described herein may be combined into single or multiple embodiments, and alternate embodiments having fewer than or more than all of the features herein described are possible. Moreover, the scope of the present disclosure covers conventionally known manners for carrying out the described features and functions, and those variations and modifications that may be made as would be understood by those skilled in the art now and hereafter.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present methods.

While various embodiments have been described, various changes and modifications may be made which are well within the scope of the present disclosure. For example, any number of actuator systems, drive systems, pivot systems, covers, robotic arms, and/or weighing systems may be utilized. Further, numerous other changes may be made which will readily suggest themselves to those skilled in the art and which are encompassed in the spirit of the disclosure and as defined in the appended claims.

What is claimed is:

1. A method for preventing material contained inside a collection bin from being blown out of the collection bin, the method comprising:
    monitoring movement of a fork assembly on a waste collection vehicle;
    generating an actuation command based on the step of monitoring the movement of the fork assembly thereby sending the actuation command to an actuator system via at least one of a wired system or a wireless system; and
    actuating the actuator system of an automated cover system based on the actuation command,
    wherein the step of actuating the actuator system automatically moves a cover attached to the collection bin.

2. The method of claim 1, further comprising actuating the actuator system based on a command received from an operator selected trigger in addition to the actuating of the actuator system based on the actuation command.

3. The method of claim 1, further comprising manually moving the cover attached to the collection bin in addition to the actuating of the actuator system based on the actuation command.

4. The method of claim 1, wherein the step of monitoring movement includes determining that the collection bin attached to the fork assembly has moved to a position for transport, and wherein the step of actuating the actuator system automatically moves the cover from an open position to a closed position.

5. The method of claim 1, wherein the step of monitoring movement includes determining that the collection bin attached to the fork assembly has moved to a position for emptying into a hopper of the waste collection vehicle, and wherein the step of actuating the actuator system automatically moves the cover from a closed position to an open position.

6. The method of claim 1, wherein the step of monitoring movement is performed by a switch.

7. The method of claim 6, wherein the step of generating the actuation command is performed based on activation of the switch.

8. A method for preventing material contained inside a collection bin from being blown out of the collection bin, the method comprising:
    monitoring movement of the collection bin on a waste collection vehicle;
    generating an actuation command based on the step of monitoring the movement of the collection bin thereby sending the actuation command to an actuator system via at least one of a wired system or a wireless system; and
    actuating the actuator system of an automated cover system based on the actuation command,
    wherein the step of actuating the actuator system automatically moves a cover attached to the collection bin.

9. The method of claim 8, wherein the step of monitoring movement includes determining that the collection bin has moved to a position for transport.

10. The method of claim 8, wherein the step of monitoring movement includes determining that the collection bin has moved to a position for emptying into a hopper of the waste collection vehicle.

11. The method of claim 8, wherein the step of monitoring movement is performed by a switch.

12. The method of claim 11, wherein the step of generating the actuation command is performed based on activation of the switch.

13. The method of claim 8, further comprising actuating the actuator system based on a command received from an operator selected trigger in addition to the actuating of the actuator system based on the actuation command.

* * * * *